May 20, 1969     L. E. DAVIDSON     3,445,158
CONTINUOUS SURVEILLANCE PHOTOGRAPHIC RECORDER
Filed Sept. 14, 1966

INVENTOR,
Lee E. Davidson

BY: Harry M. Saragovitz,
Edward J. Kelly &
Herbert Berl    ATTORNEYS.

United States Patent Office 3,445,158
Patented May 20, 1969

3,445,158
CONTINUOUS SURVEILLANCE PHOTOGRAPHIC RECORDER
Lee E. Davidson, R.D. 2, Box 147,
Havre De Grace, Md. 21078
Filed Sept. 14, 1966, Ser. No. 579,809
Int. Cl. G03b 41/06
U.S. Cl. 352—68      4 Claims

ABSTRACT OF THE DISCLOSURE

A film advance and shutter mechanism for a motion picture camera operated by a motor driven shaft which is coupled to a pair of Geneva drive assemblies arranged, one each, on either side of the shaft and which intermittently advance film over the two lens of the camera. The shutter mechanism of the camera is operated by the free end of the shaft which carries a pulley for quick conversion from double shutter operation to single shutter operation.

---

The invention described herein may be manufactured and used by or for the Government, for governmental purposes, without the payment to me of any royalty thereon.

The present invention relates to photographic recorders and more particularly to a film advance and shutter mechanism for a continuous surveillance photographic recorder.

Self-luminous phenomena, such as munitions explosions, often must be photographed during daylight field tests. The explosions may be of extremely short duration and may occur at relatively unpredictable intervals. Because of the short duration, visual records of the blasts can be obtained only with high speed photography. It is necessary to use camera speeds which insure a complete cycle of exposure and film advance in less time than it takes for the explosion to occur. The random nature of hit location and timing has demanded in the past, the use of several cameras, each operating at high speed with shutter mechanisms out of phase to provide for continuous photographic coverage. The last named characteristic is difficult to achieve and therefore renders the use of multiple cameras costly and inefficient. Most multiple camera systems utilize 16 mm. film; the present invention uses, but is not limited to, 70 mm. film.

The device of the instant invention comprises essentially the design of and cooperation between pairs of film advance mechanism, rotating shutters and lens assemblies; all are contained within a moving picture camera housing and cooperate with the standard accessories found therein—e.g., motor, multiple speed regulator, aperture control, and the like. The film advance mechanisms and their respective shutters are arranged and geared so that film will be advanced in one system, while it is exposed in the other. Additionally, the shutters are open at least 51% of the time; the opening and closing of the shutters and the film advance requiring no more than 49% of the time of operation. In that manner, the recorder can observe an area continuously without the usual interruptions caused by the film advance and the concomitant closing of the shutter.

It is the primary object of the present invention to provide a means for truly continuous photographic surveillance. It is another object to provide a photographic recorder which can replace the present use of multiple 16 mm. cameras and would operate at a higher speed than that required by current equipment. It is still another object to provide a photographic recorder which is less expensive to construct and to operate. It is a final object of the subject invention to provide a photographic recorder capable of greater area coverage with less wasted film than in existing equipment.

These and other objects and advantages of the present invention will be fully apparent from the following description taken in connection with the annexed drawing, in which.

Figure 1:
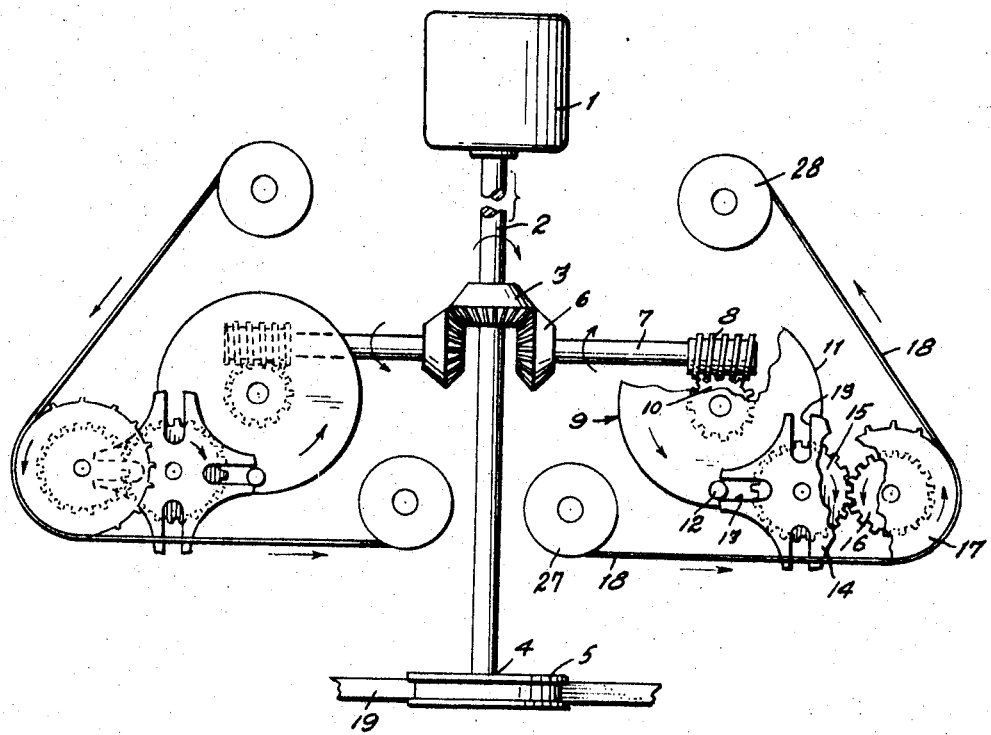
FIGURE 1 is a top plan view with parts broken away of the film advance mechanism of the present invention with parts left out for clarity.

The device of the instant invention is as follows:

The camera motor 1 drives a shaft 2 which is coupled directly to a bevel gear 3. At the end 4 of the shaft 2 is a timing pulley 5. The bevel gear 3 drives another bevel gear 6 as the shaft 2 rotates. Directly coupled to the second bevel gear 6 is a shaft 7 which in turn is integral with worm gear 8 driving a Geneva driver assembly 9. The Geneva driver assembly 9 consists of a gear 10 which coaxially carries a disk 11 upon which is mounted a radially spaced stud 12 which engages slots 13 in the Geneva starwheel or follower 14 to rotate it intermittently. The follower 14 is gear coupled as at 15, 16 to the toothed film advance spool 17 which also rotates intermittently due to the starwheel drive, thereby advancing the film 18. The film 18 originates from unwinding spool 27 containing a predetermined length of unexposed film and is recovered on a winding or takeup spool 28. An identical second film advance system is arranged diametrically opposite the system described above. Driven also by shaft 2, the second system advances its own film at a rate equal to that of the first system.

Twin rotating shutter assemblies cooperate respectively with the two film advance systems. The shutter assemblies are coupled by a timing belt 19 which is driven by timing pulley 5 and which drives pulleys 20, 21 upon which the shutters 22, 23 are mounted. The shutters 22, 23 are semicircular sectors of slightly less than 180°. Pulleys 20, 21 and their respective shutters 22, 23 are oriented so that rotation of the wheels results in alternating exposure of each of the lens assemblies 24, 25 arranged in proximity to the shutters. The alternating exposure is accomplished by orienting the shutters with radial edges 29 and 29' in parallel relation and radial edges 30 and 31' also in parallel relation.

Figure 2:
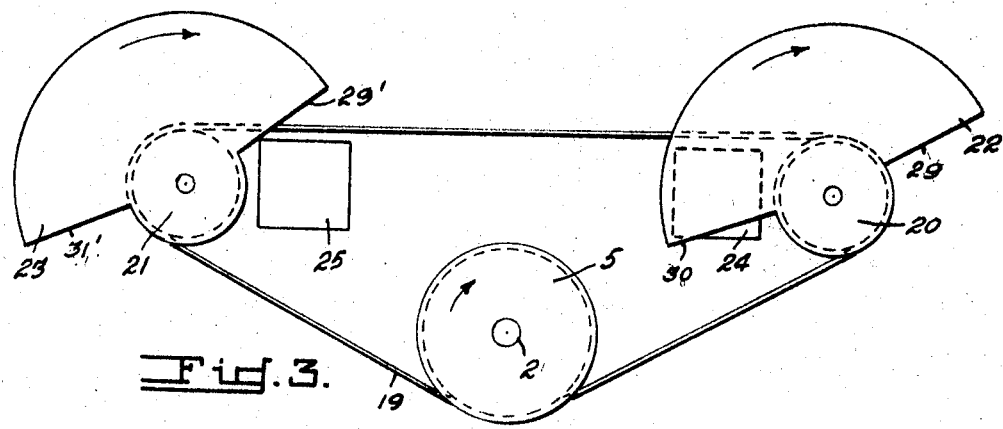
FIGURE 2 is a schematic front elevational view of the twin shutter mechanism of the instant invention with parts left out for clarity.
Figure 3:
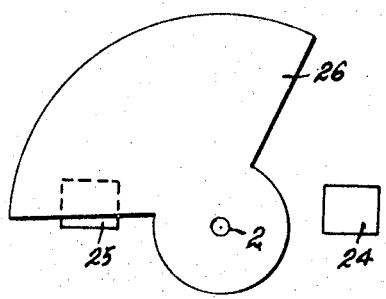
FIGURE 3 is a detail front elevational view of a modification of the shutter mechanism utilizing a single shutter.

By properly locating the slots 13 in the Geneva followers with relation to the orientation of the shutters 22, the two mechanisms are synchronized so that film advance occurs only during exposure window blackout by the shutters in the respective systems. Additionally, that the shutters 22, 23 are less than 180° sectors insures exposure for more than half of the operating period. This provides a slight overlap in the pictures produced during a partial masking of the lens assemblies 24, 25 by their respective shutters 22, 23. The same effect is possible with a single rotating shutter 26 mounted directly on the timing pulley 5 as shown in FIGURE 3 with the same film advance mechanism as shown in FIGURE 2. Also, as shown in FIGURE 3, the shutter 26 can be a much smaller sector, thereby permitting full exposure of at least one window at all times.

While preferred forms of the invention are shown and described, other forms of the invention are contemplated and numerous changes and modifications may be made therein without departing from the spirit of the invention as set forth in the appended claims.

What is claimed is:

1. In a motion picture camera, a film advance and shutter assembly comprising, in combination, an elongated shaft, a motor coupled to one end of said shaft, a pair of photographic films correspondingly disposed on either side of said shaft, a pair of feed reels for said film, a pair of take-up reels to recover said film, a pair of film advance mechanisms correspondingly disposed on either side of said shaft, said film advance mechanisms driven by said shaft to simultaneously advance said pair of films, a pair of lens assemblies correspondingly disposed on either side of said shaft, each of said lens assemblies directing external image to one of said films, a timing pulley mounted on the other end of said shaft, and a shutter mechanism driven by said timing pulley to alternately expose and mask said lens assemblies and their respective films, said film advance mechanisms advancing their respective films when their respective lens assemblies are masked by said shutter mechanism, whereby the films are continuously exposed.

2. The assembly set forth in claim 1, wherein said film advance mechanisms each comprises a Geneva driver assembly driven by said shaft, a Geneva follower driven by said Geneva driver assembly, and a film advancing spool guiding said film and driven intermittently by said Geneva follower assembly, whereby said film is advanced intermittently.

3. The assembly set forth in claim 1, wherein said shutter mechanism consists of a pair of pulleys correspondingly disposed on either side of said timing pulley, a belt circumferentially driven by said timing pulley and circumferentially driving said pair of pulleys, and a pair of opaque sectors centrally carried by said pair of pulleys, said sectors having radii sufficient to permit complete masking of each of said lens assemblies when said pair of pulleys rotate.

4. The assembly set forth in claim 1, wherein said shutter mechanism consists of a single opaque sector centrally mounted on said timing pulley.

References Cited

UNITED STATES PATENTS

| 1,313,587 | 8/1919 | Douglass. |
| 1,753,622 | 4/1930 | Owens _____ 352—59 |

FOREIGN PATENTS

| 585,496 | 12/1924 | France. |
| 284,023 | 1/1928 | Great Britain. |

JULIA E. COINER, *Primary Examiner.*

U.S. Cl. X.R.

352—59, 62, 135